US012693125B1

(12) United States Patent
Tanas et al.

(10) Patent No.: US 12,693,125 B1
(45) Date of Patent: Jul. 28, 2026

(54) SYSTEMS AND METHODS FOR DETERMINING A SHORTEST PATH BETWEEN NODES

(71) Applicant: Amazon Technologies, Inc., Seattle, WA (US)

(72) Inventors: Andrei Tanas, Vienna, VA (US); Aaron Sterling Dean, Eatonville, WA (US); Michael Norris Rice, Palo Alto, CA (US); Renato Werneck, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 18/192,438

(22) Filed: Mar. 29, 2023

(51) Int. Cl.
| | |
|---|---|
| *G01C 21/34* | (2006.01) |
| *G06Q 10/047* | (2023.01) |
| *G06Q 10/083* | (2024.01) |

(52) U.S. Cl.
CPC ....... *G01C 21/3446* (2013.01); *G06Q 10/047* (2013.01); *G06Q 10/08355* (2013.01)

(58) Field of Classification Search
CPC ...................... G06Q 10/047; G06Q 10/08355
See application file for complete search history.

(56) References Cited

U.S. PATENT DOCUMENTS

| | | | | |
|---|---|---|---|---|
| 10,062,188 B2 * | 8/2018 | Delling | ................. | G06T 11/206 |
| 12,203,773 B1 * | 1/2025 | Jau | ..................... | G01C 21/3807 |
| 2013/0261965 A1 * | 10/2013 | Delling | .................. | H04L 45/12 |
| | | | | 701/527 |
| 2025/0202800 A1 * | 6/2025 | Baruah | .................. | H04L 45/64 |

OTHER PUBLICATIONS

Bast et al. Route Planning in Transportation Networks* (Year: 2015).*
Zhe et al. Asymmetric Structure-Preserving Subgraph Queries for Large Graphs (Year: 2015).*
Bruera et al. Dynamic Multi-level Overlay Graphs for Shortest Paths (Year: 2007).*
Delling et al. High-Performance Multi-Level Graphs* (Year: 2006).*
Ye Li et al. An Experimental Study on Hub Labeling based Shortest Path Algorithms (Year: 2017).*

* cited by examiner

*Primary Examiner* — Ryan Rink
(74) *Attorney, Agent, or Firm* — Eversheds Sutherland (US) LLP

(57) ABSTRACT

Systems and methods for determining a shortest path between nodes are provided. The systems and methods involve the use of a modified multi-level overlay (MLO) algorithm that allows for multiple potential paths to be computed at a rate that allows for more efficient delivery route planning in real-time or otherwise. The MLO data structure is used to generate hub labels that are subsequently used to determine the shortest path. Additionally, the MLO data structure is modified to provide for a more efficient shortest path determination. For example, the modified MLO data structure may improve efficiency at least by optimizing partitioning parameters and performing label intersection, as is described below in additional detail. This optimization may reduce the search space used by the MLO data structure during a query stage when a shortest path associated with a routing determination is performed.

14 Claims, 7 Drawing Sheets

100

105
104
106
108
107
109
102
110

200

202 — Recursively partition the graph, creating multi-level overlay (MLO)-hierarchy of cells, minimizing the number of arcs crossing cell boundaries 204 — Arc rename: re-assign arc IDs in level and cell order 206 — Graph customization: for every cost function, compute and save the cost of shortcut arcs 208 — Store graph

300

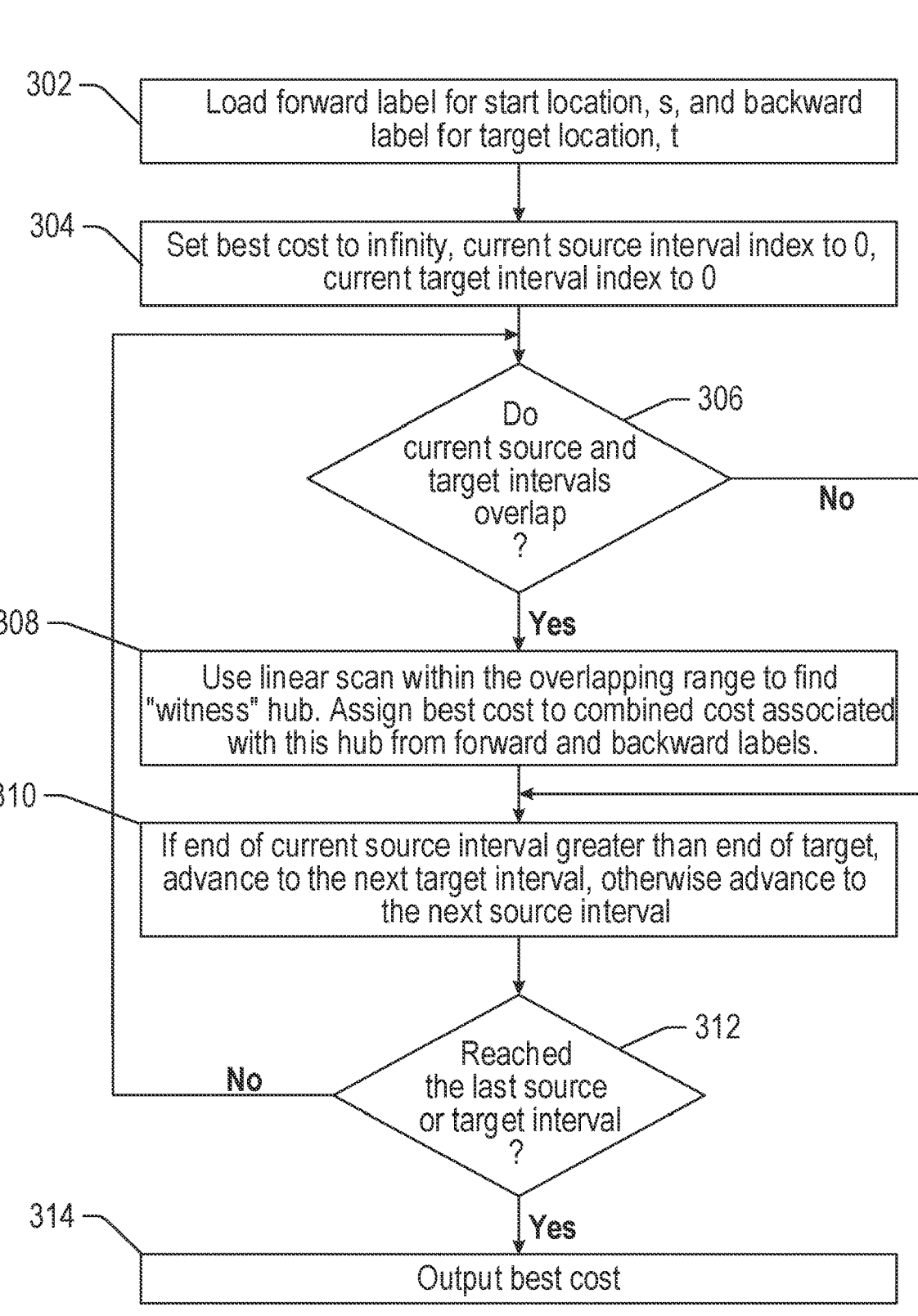

302 — Load forward label for start location, s, and backward label for target location, t 304 — Set best cost to infinity, current source interval index to 0, current target interval index to 0

306 — Do current source and target intervals overlap ?

No

Yes

308 — Use linear scan within the overlapping range to find "witness" hub. Assign best cost to combined cost associated with this hub from forward and backward labels.

310 — If end of current source interval greater than end of target, advance to the next target interval, otherwise advance to the next source interval 312 — Reached the last source or target interval ?

No

Yes

314 — Output best cost

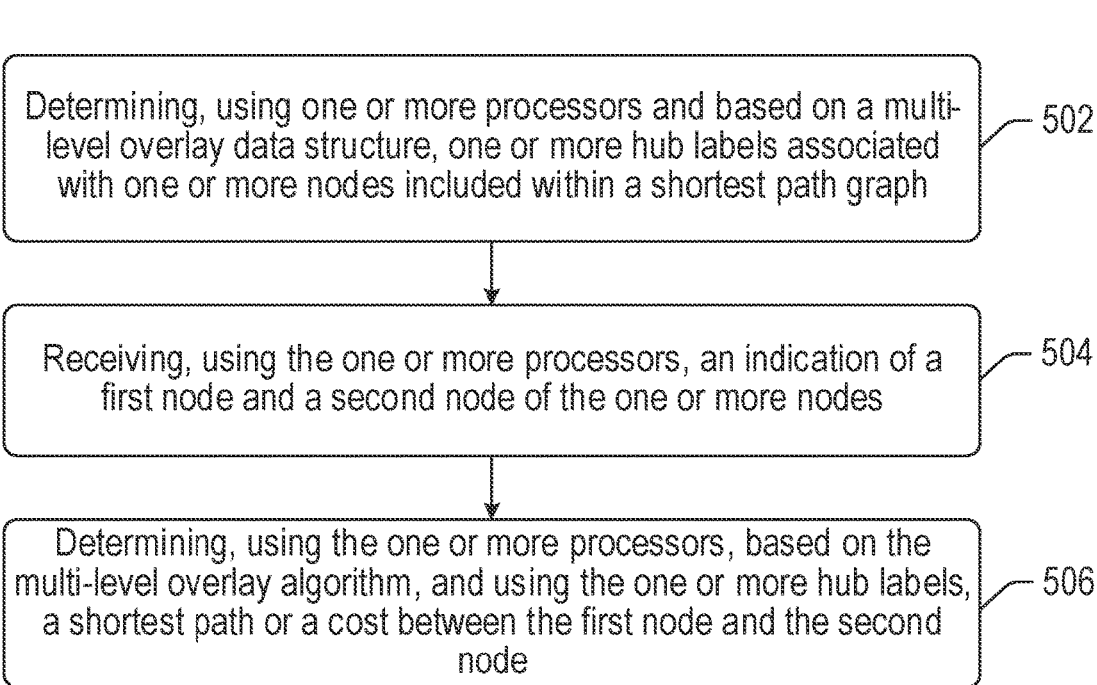

Determining, using one or more processors and based on a multi-level overlay data structure, one or more hub labels associated with one or more nodes included within a shortest path graph — 502

Receiving, using the one or more processors, an indication of a first node and a second node of the one or more nodes — 504

Determining, using the one or more processors, based on the multi-level overlay algorithm, and using the one or more hub labels, a shortest path or a cost between the first node and the second node — 506

FIG. 5

SYSTEMS AND METHODS FOR DETERMINING A SHORTEST PATH BETWEEN NODES

BACKGROUND

Hub labeling is a technique used to determine a shortest path between nodes in a graph. A hub is a location (e.g., a node or arc) in the graph on the shortest path from an origin to a destination, and a hub label is a set of hubs associated with the origin or destination that guarantees that any pair of origin and/or destination labels includes at least one hub on the shortest path between origin and destination. Typically, hub labels are generated from contraction hierarchies (CH). However, conventional algorithms may not necessarily compute multiple delivery routes in an optimal manner. This may be undesirable in contexts such as delivery route computations.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 3 illustrates an example method for interval-based label queries, in accordance with one or more example embodiments of the disclosure.

FIG. 5 illustrates an example method for determining a shortest path between nodes, in accordance with one or more example embodiments of the disclosure.

DETAILED DESCRIPTION

Figure 1:
FIG. 1 illustrates an example graph, in accordance with one or more example embodiments of the disclosure.

This disclosure relates to, among other things, systems and methods for determining a shortest path between nodes. The systems and methods involve the use of a modified multi-level overlay (MLO) data structure that allows for multiple potential paths to be computed at a rate that provides for more efficient automated delivery route generation in real-time or otherwise. Particularly, in contrast with traditional approaches that involve the use of contraction hierarchies (CH) to generate hub labels associated with the shortest path graph, the MLO data structure is instead used to generate the hub labels. The MLO data structure as described herein is also modified to provide for a more efficient shortest path determination. For example, the modified MLO data structure may improve efficiency at least by optimizing partitioning parameters and performing label intersection, as is described below in additional detail. This optimization may reduce the search space used by the MLO data structure during a query stage when a shortest path associated with a routing determination is performed. While reference may be made herein to the use case of route generation for package deliveries, this is not intended to be limiting. For example, such methods may be applied in a number of other contexts, such as computer networking, supply chain optimization, path finding between social network contacts, etc.

A graph may generally refer to a data structure that represents connections (which may be called "edges" or "arcs" in some cases) between pairs of nodes (also referred to as "vertices"). Generally, the nodes may represent any elements, such as objects, entities, etc. In an example use case described herein, the nodes may represent locations included within a road network along which delivery routes may be generated (for example, the algorithms described herein and the generation of the delivery routes may be performed by any system and/or device, such as mobile device 602, computing device 620, computing device 700, etc.) for delivery vehicles to perform deliveries. Large graphs, such as road networks or social networks, may include tens of millions of edges and nodes. A graph may also be considered a weighted graph in which a weight or cost value is associated with the various connections in the graph. For example, the weight or cost may represent distance between the nodes, an amount of time it may take to traverse the connection between the nodes, etc. Classic path finding algorithms such as Dijkstra's algorithm may traditionally be employed with these graphs to determine a shortest path between any two nodes in the graph. For example, in the use case of delivery routing, the algorithm may be used to determine a shortest delivery route between a given starting location represented by a first node and a delivery location represented by a second node.

A hub label is a data structure containing a set of hubs, which are locations in the graph (e.g., nodes and/or arcs) on the shortest path from (e.g., forward label) or to (e.g., backward label) the given location (e.g., label's terminal), and their associated costs. Hub labels may have a cover property that for any pair of origin and destination labels, there may be at least one hub on the shortest path between the origin and the destination. A hub label may include a hub identifier, which may be a unique identifier for the particular hub label (for example, a numerical value identifying the hub), as well as a cost associated with the hub. A typical hub label client application fetches hub labels for different destination the client works with. When it is desired to calculate the "cost" (e.g., time or distance) of the shortest path cost between two locations, the corresponding labels may be intersected. That is, with hub labels, the part of the algorithm that matches the forward search from the origin with the backward search from the destination may only need to be evaluated when required. This makes hub labels particularly suitable for workflows that involve calculating many combinations of origin and/or destination pairs, and for incremental workflows (e.g., adding an additional location to a working set requires fetching a single label).

Dijkstra's Algorithm begins at a source node (for example, a starting location in the use case of delivery routing) and analyzes the graph to identify the shortest path between that node and all the other nodes in the graph. The algorithm keeps track of the current shortest distance (e.g., "best cost") from each node to the source node. These values are updated anytime the algorithm identifiers a shorter path. When the shortest path between the source node and another node is identified, the node is marked as a visited node and added to the path. The process continues until all the nodes in the graph have been added to the path. In this manner, a path is identified that connects the source node to all other nodes following the shortest path possible to reach each node.

Given that all of the paths are explored in this traditional Dijkstra's algorithm, this process to find the shortest path between two nodes may often be time consuming. This inefficiency makes algorithms that scan the entire graph unfavorable for solving some types of problems. For example, this may be undesirable in the context of delivery vehicle routing, which may need to update in real-time in some scenarios.

Other algorithms provide advantages over the classical Dijkstra's algorithm. For example, CH is an algorithm that may be used to generate hub labels. The CH algorithm relies on "shortcuts" created in a pre-processing phase to reduce the search space. That is, the number of vertices CH processes during the query time. To achieve this, iterative vertex contractions may be performed. When contracting a vertex, v, the vertex is temporarily removed from the graph, and a shortcut is created between each pair $\{u, w\}$ of neighboring vertices if the shortest path from u to w includes v. At query time, the algorithm performs a bi-directional upward search. Starting forward from the origin and backward from the destination, the algorithm may perform a search on the original graph, augmented by the shortcuts, progressing to "more important" nodes (higher in the hierarchy), and skipping portions of the augmented graph with lower priority. The search space may be limited by the "height" of the contraction hierarchy. Hub labels are typically produced from CH by extracting the identifiers of the nodes visited during upward search, along with distances required to reach them.

In contrast with the traditional approach of using CH to produce hub labels, the systems and methods described herein involve the use of a multi-level overlay (MLO) data structure to produce the hub labels. MLO is another data structure to enable fast query performance through preprocessed overlay graphs. The separator-based MLO is produced by recursively partitioning the graph into a hierarchy of cells. Each cell may be represented as a set of arcs that cross the boundary of the cell and a matrix of costs between the boundary arcs, acting as shortcuts. An arc may represent a connection between two nodes on a graph. As an example, an arc may represent a street between two intersections in an area, where the intersections represent nodes in a graph. The cost of these shortcuts may be precomputed during the customization phase using a modified Dijkstra search, for example. At query time, the bi-directional search algorithm may use a forward Dijkstra search from the origin and backward search from the destination. The search algorithm may progress up in the cell hierarchy following the boundary arc every time the search reaches a cell boundary, and iteratively continue the search until the topmost layer is reached. The algorithm finds common arcs between the forward and backward search portions with lowest combined distance from the origin to the destination.

The advantages of separator-based MLO graphs compared to CHs may include: (a) preprocessing may be metric-independent (e.g., the same augmented graph can be used for different metrics such as historical speeds, real time speeds, or distances) and (b) the customization phase is efficient (e.g., can be completed in seconds and/or any other amount of time) since the customization of each layer uses shortcuts from the previous layer, making it suitable for graphs that model frequently changing conditions, such as traffic speed associated with roads included in a delivery vehicle routing. MLO graphs are suitable for point-to-point and many-to-many queries used to find individual shortest paths or to compute dense matrices of shortest path "costs" for multiple origin and destination pairs.

CH and MLO have some similarities and provide efficiencies over the classical Dijkstra's algorithm. For example, CH and MLO both achieve fast query times by performing pre-processing that introduces hierarchies of shortcuts, and both limit the graph search space by only searching upward in the shortcut hierarchies. With CH, the query phase reduces the search space by performing a bi-directional upward search: starting from the origin, performing the search on the graph augmented by the shortcuts, and proceeding to more important nodes (e.g., higher in the hierarchy). The separator-based MLO search also achieves high performance by reducing the search space. The separator-based MLO performs an upward search from the original graph, following the cell hierarchy. The MLO search may operate on arcs instead of vertices. For example, the algorithm may pre-compute an amount of time it takes to traverse from a starting location to a highway on-ramp, an amount of time it takes to traverse the highway to an exit, etc. These values are saved as the costs or weights associated with the edges (in some instances, the terms "edges" and "arcs" may be used interchangeably herein) that represent these portions of the road network in the graph.

Additionally, these shortcuts may be updated as corresponding factors change. For example, the costs or weights associated with different road segments may change depending on factors such as an amount of traffic on the road, among other factors. One advantage of the MLO data structure over CH is that the structure of the graph for MLO remains constant even with these changing values. In contrast, the graph for CH may change over time.

To improve performance of path finding in large graphs, several techniques may be introduced to the modified MLO data structure described herein. These techniques achieve fast query times by reducing the algorithm's search space, typically through pre-processing that modifies the original graph by adding "shortcuts" that allow the shortest path search algorithm to bypass large portions of the graph.

In one or more embodiments, to calculate shortest path cost between two labels, a corresponding sets of hubs may be intersected to identify a witness hub, which may be the shared hub with the minimum sum of the cost from each hub label. The hubs in each hub label may be sorted by hub identifiers. In some cases, a query may perform a linear scan through each hub set.

The hub labeling algorithm is based on the observation that the sets of vertices visited by the forward and reverse searches of hierarchical algorithms (such as CH) represent the corresponding labels. With MLO, instead of seeking a match while running a forward search from the origin and backward search from the destination, the search may continue until the search reaches the top-level cell, the references to the visited arcs on the shortest paths from the origin or to the destination are saved along with the cost to reach them, the equivalent of the origin or the destination's hub labels may be obtained.

The cover property of hub label may be that for any pair of origin and destination labels, there may be at least one hub on the shortest path between origin and destination. It is not only possible to efficiently produce hub labels that satisfy this requirement from the separator-based MLO graphs, but it is also possible to achieve performance comparable to CH-based hub labels, taking advantage of faster customization phase and stable augmented graph structure, unaffected by customization (e.g., cost function pre-computation).

The hubs in these hub labels may be arcs of the original graphs, and the cost for each hub stored in the label may be calculated from the label's terminal to a predefined point along the arc. For example, the tail or the arc may be used, as well as any other portion of the arc. The MLO structure defines a hierarchy of overlay cells. The preprocessing phase that augments the original graph with separator-based MLO cells and shortcuts identifies "boundary arcs," which may be graph arcs that cross cell boundaries. The lowest-level cell that includes both the head and tail of an arc may determine the level of the arc itself.

With the MLO data structure, the stable graph structure of the MLO allows arc identifiers (that may later become hub identifiers) to be assigned in a specific order that is preserved during the graph customization (cost function pre-computation) phase. This contrasts with the CH algorithm, in which the graph may change over time.

In one or more embodiments, arc identifiers may be ordered by: (a) level, such that arc identifiers increase or decrease monotonically based on the level of the graph with which they are associated and (b) cell, such that arcs that originate in the same cell are assigned identifiers sequentially. This enables performance optimizations that may not be possible with CH-based hub labels.

Since hubs in the label are sorted by identifiers, assigning arc identifiers in the augmented graph in this level and/or cell order may result in the following characteristics of the MLO hub labels. First, hubs within the label may be grouped by level, and all hubs that belong to the same level may be included within a single cell of the next level (this can be exploited to limit the label intersection to start at the level that corresponds to the lowest cell, shared between the labels being intersected). Second, hubs within the label may appear in sequential groups. This may be exploited by: (a) storing an array of identifier intervals instead of hub identifiers and (b) optimizing the label query by intersecting the much smaller arrays of intervals. These properties may be used to improve the performance of the hub label query operation.

To produce the separator-based MLO, the original graph may be partitioned into a multi-level hierarchy of cells. Cells at different levels may include shortcuts for portions of the graph from the previous level, beginning with the arcs of the original graph (e.g., "level 0"). To satisfy the cover property, in pairs of forward and backward labels, one of the labels (e.g., the forward label) may contain all level 0 arcs from the same cell as the label's terminal, and one of the labels (e.g., the backward label) must include all boundary arcs of the top level, except for the arcs completely within the cell containing the terminal, in addition to all boundary arcs between the lowest and the highest levels on shortest paths from the terminal. The graph partitioning algorithm and associated parameters may determine the numbers of arcs in each cell and the arcs crossing cell boundaries of the arc. Finding graph partitions with a smaller number of arcs in the lowest level and smaller number of boundary arcs may result in fewer average number of hubs per label.

The hub label query performance may also be optimized in the modified MLO. To accomplish this, the hub arrays may be scanned at least until the a "witness" hub (for example, a hub common to the starting location and the destination location, such as hub 110 in FIG. 1) position, which yields the shortest-path result of the query, is reached in these two arrays. This reduces any "scan waste," which may include any additional scanning before or after this witness hub position.

A first example of a manner in which scan waste may be reduced involves performing label intersection with an MLO inverted index. The MLO structure defines a hierarchical partition of the vertex set of the graph. During a search using MLO, the level and cell of the lowest common ancestor that includes both the source and target may be used as the search space. This lowest common ancestor may be determined by performing a forward search from a starting location and a backward search from a destination location until the arcs of both searches intersect within a common cell. The lowest common ancestor then becomes this particular cell and level of the cell. This reduces the search space in which the search is performed.

The MLO structure may be used in much the same way to index the hubs for each label. Given a multi-level overlay partitioned graph with "L" levels, for any two locations "s" and "t" there may exist a lowest common ancestor in the cell hierarchy with level "Lc." The solution for the shortest path query between s and t may exist at or above Lc. When intersecting the two sets of hubs for these labels, the number of levels required to intersect may be bounded to [Lc, Lmax]. Using this observation, the resulting intersection operation may be reduced to only scan hubs from cells of levels [Lc, Lmax]. By including an index of size 2*L, the subsequence of the array of hubs corresponding to the hubs for any level may be determined.

To intersect two labels, the index of Lc may be determined in the cell parents array representing the level of Lc. The maximum index within the array of hubs that is required to intersect may then be determined. The intersection can then be performed on the subsequence of the hub IDs from these offsets using any intersection algorithm.

In one or more embodiments, the improved MLO data structure may minimize arc boundaries. As an example, a neighborhood may include a series of roads with some of the roads connecting one main road into the neighborhood to another main road into the neighborhood. Example neighborhood with roads. Identifying these road segments that connect roads to larger roads improves the efficiency of the process. Thus, the connecting roads through the neighborhood that connect the two main roads are used rather than searching all of the roads that exist in the neighborhood. In this manner, efficient graph partitions may be generated to identify cell structure in a way so few boundary arcs as possible.

A second example of a manner in which scan waste may be reduced involves a label intersection with an interval algorithm. The hub labels that are generated using MLO may have hub sets which include primarily long sequences of hub identifiers. Instead of storing all of these identifiers, the identifiers may be pre-processed to store a set of contiguous intervals instead, along with an array holding the offset into the cost array for the start of each hub interval. That is, the identifiers may be re-ordered to be sequential when generating the MLO structure, which is possible based on the stable nature of the MLO graph. As upwards searching is performed, hubs may be collected for particular locations and the hubs may be associated with a range of values. However, instead of storing all of the hub identifiers (for example, values of 10, 11, 12, . . . , 100) the identifiers may instead be represented as a range of values (for example, a range from 10 to 100). This allows for the process of identifying similarities between hub identifiers to be performed by identifying overlaps between ranges associated with hub identifiers.

Intersecting two labels may involve iterating through each hub interval. When the intervals overlap, the comparison may be reduced to only the overlap of the ranges, advancing the interval whose minimum value is lower. This technique involves strong cache locality, as no hub comparisons may need to be made for the overlapping portions of the intervals. In the degenerate case, this may still act as the existing linear search. The results of this method show an increase in intersection throughput proportional to the reduction in the number of hubs that need to be scanned. The performance of the queries using this approach is comparable to that of queries with CH-based labels, while supporting more complex MLO graphs with more capabilities.

Hubs in a given interval are likely to belong to the same cell or the same level, and therefore may represent similar distances from a source. By storing the minimum cost for each interval, the interval intersection algorithm may be extended to skip intervals if their minimum cost is larger than the current best cost value. This minimizes the number of individual hubs that need to be compared and improves label intersection performance further. Any of these three approaches may also be used in combination.

An additional improvement to the modified MLO may include a stable identifier ordering of MLO-based hub labels that allows for the assignment of hub identifiers in the order that monotonically increases by MLO level. This results in hubs generated from lower-level arcs to appear early in the hub array. For local queries (for road network graphs, this could mean within the same city, as opposed to different parts of the continent), this means that the witness hub may be found early in the query, and it may be possible to avoid scanning all subsequent intervals whose minimum cost is higher.

In terms of label pruning and the generation of canonical labels, asymmetric pruning or hook pruning may be used. With asymmetric pruning, forward and backward labels may be generated independently from one another. This may result in multiple witness hubs representing the same shortest path between a forward and backward label pair. To reduce the number of these occurrences, and to minimize the total number of hubs per label, one of the labels (either the forward or backward label) may include only the boundary arcs of the label terminal's parent cell hierarchy. During label construction time, the search algorithm may explore all arcs to ensure correct hub costs, but only use the boundary arcs of the parent cell hierarchy as hubs.

Hook pruning is another approach that reduces the label size is to detect situations where the shortest path enters some cell via arc X, exits the cell via arc Y, and subsequently re-enters the same cell via arc Z, either immediately or through another sub-path. When this scenario is detected, arc Z and any other arcs on possible sub-sequent re-entries of the same cell may not need to be included in the label.

Any delivery routes produced by the algorithms described herein may be provided to a vehicle to subsequently traverse the route to allow the deliveries to be performed. In some instances, one or more prospective delivery routes or segments of prospective delivery routes may instead be produced. The vehicle may also be an autonomous vehicle and the vehicle may automatically traverse the route once the route is transmitted to the vehicle. In some instances, the route may be provided to a device associated with the vehicle or a device associated with a delivery driver as well. For example, navigation instructions associated with the route may be provided to a navigation system of the vehicle or an application of a smartphone of the delivery driver. The delivery driver may then manually drive the vehicle along the delivery route based on the navigation instructions.

Turning to the figures, FIG. 1 illustrates an example graph 100, in accordance with one or more example embodiments of the disclosure.

The graph 100 shown in FIG. 1 is associated with the use case of route planning (for example, for delivery vehicles or other vehicle route planning contexts). The graph 100 depicts a geographical region including various road networks. A starting location 104 and a destination location 107 are also shown within the geographical region. Associated with the starting location 104 are a number of hubs represented by circles within the geographical region (for example, hub 105, hub 106, and/or any other number of hubs). Associated with the destination location 107 are a number of hubs represented by squares within the geographical region (for example, hub 108, hub 109, and/or any other number of hubs). Also shown are one or more hubs that are shared by the starting location 104 and the destination location 107 (for example, hub 110). The hubs may represent areas of interest within the geographical region, such as road intersections, buildings, and/or any other elements in the geographical region.

The graph 100 also shows a route 102 connecting the starting location 104 and the destination location 107, which may represent a shortest route between the starting location 104 and the destination location 107 as determined using the modification MLO data structure described herein. The route 102 may not necessarily be the shortest physical distance between the starting location 104 and the destination location 107, but may be the best cost route. The term "cost" may refer to a cost between nodes in a graph, such as graph 100. For example, in the use case of delivery routing, the cost between two hubs (or the starting location 104 and the destination location 107) may be based on factors such as physical distance, time to traverse a route, factors that may impact the time to traverse the route, such as traffic and weather conditions, and/or any other factors that may impact a delivery route.

Figure 2:
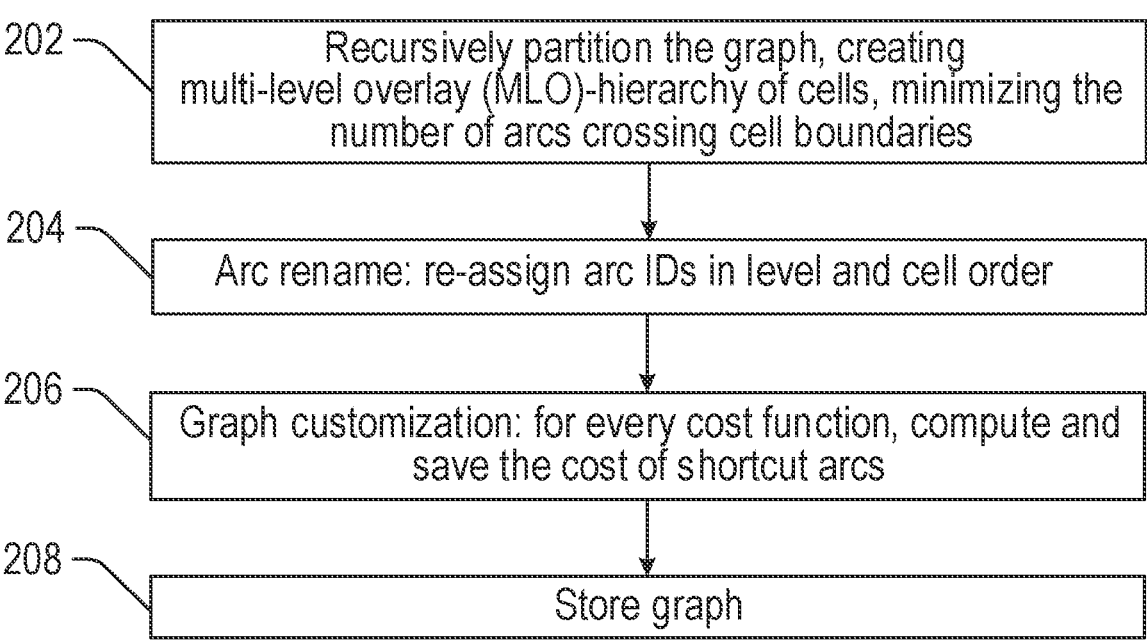
FIG. 2 illustrates an example method for graph pre-processing, in accordance with one or more example embodiments of the disclosure.

FIG. 2 illustrates an example process flow 200 for graph pre-processing, in accordance with one or more example embodiments of the disclosure.

The process flow 200 begins with operation 202, which involves recursively partitioning the graph, creating a MLO hierarchy of cells, and minimizing the number of arcs crossing cell boundaries. Individual cells may include connections between nodes for given portions of a graph. At a first level of the MLO hierarchy, multiple cells representing different regions of the graph may be determined. A second level of the MLO hierarchy may include combinations of cells from this first level. A third level may include combinations of the combined cells from the second level, and these progressive combination of cells may continue with further levels of the MLO hierarchy.

Operation 204 involves arc renaming. Identifiers associated with the various arcs may be re-assigned by level and cell order. Operation 206 involves graph customization. For the cost functions, the cost of shortcut arcs may be computed and saved. The shortcut may represent a cost between one boundary arc and another within a given cell. This reduces the search space during the pathfinding algorithm. Cost functions may be determined based on any number of parameters. With respect to the use case of route planning, a cost function, for example, may be determined based on factors, such as time to traverse between two points. As another example, penalties may be provided for left turns, which may require a delivery vehicle to temporarily stop to allow incoming traffic to pass before performing the turn. The cost function may also be based on any number of other factors. Operation 208 involves storing the graph for further processing. Once the pre-processing is performed, the graph may then be used during a query stage to determine the shortest path between any two nodes in the graph. For example, once the pre-processing is completed, the resulting stable graph may be used by a routing algorithm to determine one or more routes between a starting location and a destination location.

FIG. 3 illustrates an example process flow 300 for interval-based label queries, in accordance with one or more example embodiments of the disclosure. Process flow 300 and process flow 400 of FIG. 4 may involve operations performed subsequent to pre-processing.

Operation 302 involves performing a query. Performing the query may involve loading a forward label for start location, s, and a backward label for target location, t. These two locations may represent nodes in the graph between which a shortest path is desired to be determined. In some instances, the two nodes may include a starting location and a destination location for package delivery. However, this is not intended to be limiting and the nodes may also represent any other type of object, entity, location, etc. depending on the context in which the algorithm is being applied.

Operation 304 involves setting the best cost value to infinity, the current source interval index to zero, and current target interval index to zero. Hub labels may be defined by intervals and an index may be maintained to determine the current interval being processed.

Condition 306 involves determining if the current source and target intervals overlap. For example, determining if the intervals associated with the hub identifiers overlap. If condition 306 is met, the process flow 300 proceeds to operation 308. If condition 306 is not met, the process flow 300 proceeds to operation 310.

Operation 308 involves using a linear scan within the overlapping range to find a witness hub. The best cost is assigned to combined cost associated with this hub from the forward and backward labels. For example, two hubs may be associated with two intervals: an interval of 1-5 and an interval of 2-10. With these two hubs, the intersection is at 2-5. Thus, only the interval range of 2-5 may need to be processed. For this intersecting range, the cost may be determined to identify if a lower cost than the current best cost exists in the interval range. This process may identify the witness hub, which may be a shared hub (such as hub 110 in FIG. 1) that is on the shortest path between the starting location and destination location in the use case of determining a delivery route (or two nodes in general).

Operation 310 involves advancing to a next source interval if the end of the current source interval is greater than the end of target. Otherwise, the process flow 300 advances to the next target interval.

Condition 312 involves determining if the last source or target interval has been reached. If condition 312 is not met, the process flow 300 returns to condition 306. If condition 312 is met, the process flow 300 proceeds to operation 314. Operation 314 involves outputting the best cost value.

Figure 4:
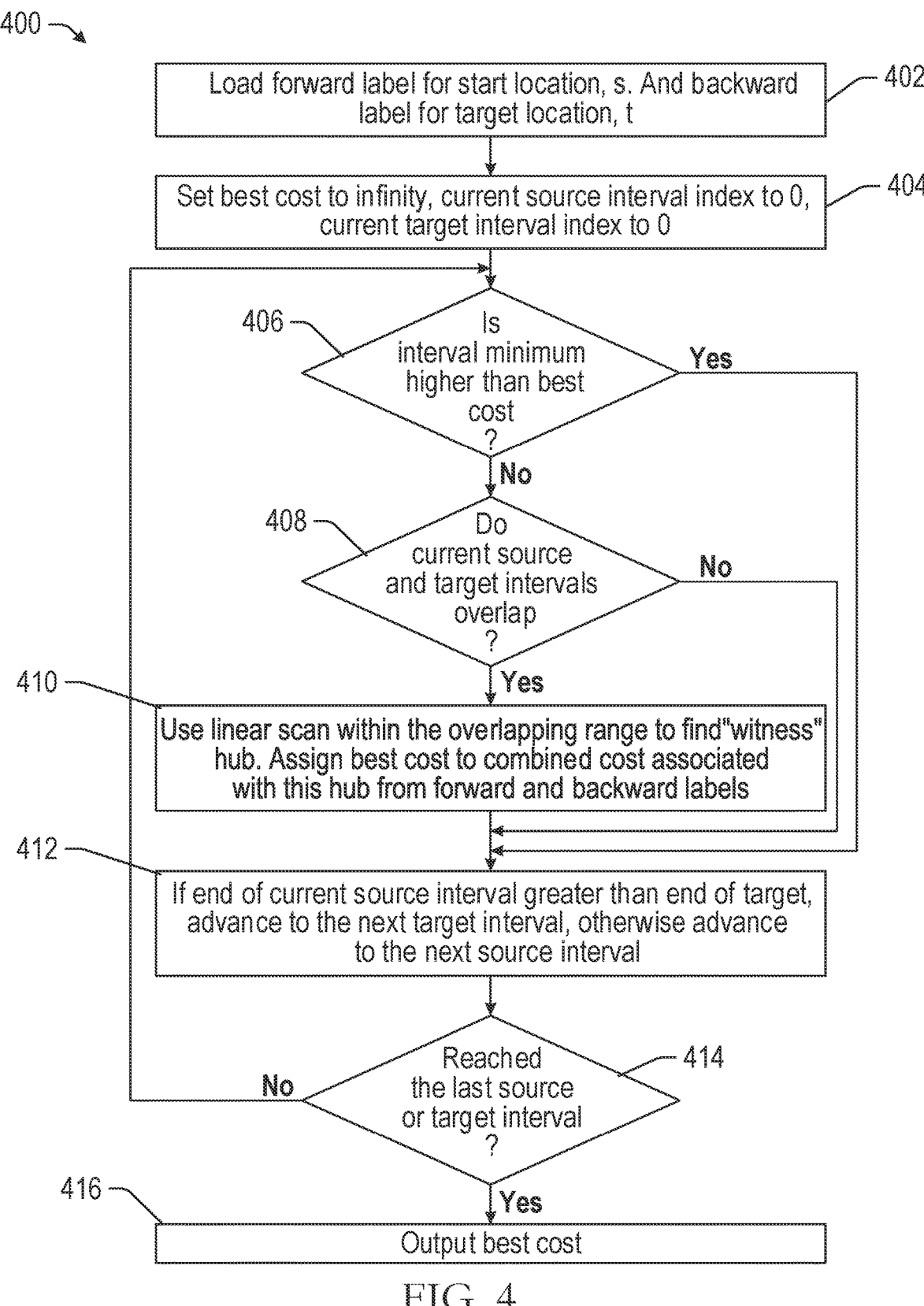
FIG. 4 illustrates an example method for intervals with interval minima, in accordance with one or more example embodiments of the disclosure.

FIG. 4 illustrates an example process flow 400 for intervals with interval minima, in accordance with one or more example embodiments of the disclosure. Process flow 400 is similar to process flow 300 of FIG. 3. However, the process flow 400 allows for certain intervals to be skipped (including overlapping intervals) if it is known that the interval does not result in the best cost being updated.

Operation 402 involves initiating a query. For example, a query to identify a shortest path between a first node and a second node. In one or more embodiments, initiating the query may involve loading a forward label for start location, s, and a backward label for target location, t (the start location and target location may correspond to a start location and destination location of a delivery route, for example).

Operation 404 involves setting the best cost value to infinity, the current source interval index to zero, and the current target interval index to zero.

Condition 406 involves determining if the interval minimum is higher than the best cost. If condition 406 is not met, the process flow 400 proceeds to condition 408. If condition 406 is met, the process flow 400 proceeds to operation 412.

Condition 408 involves determining if the current source and target intervals overlap. If condition 408 is met, the process flow 400 proceeds to operation 410. If condition 408 is not met, the process flow 400 proceeds to operation 412.

Operation 410 involves using a linear scan within the overlapping range to find a witness hub. The best cost is assigned to combined cost associated with this hub from the forward and backward labels.

Operation 412 involves advancing to a next source interval if the end of the current source interval is greater than the end of target. Otherwise, the process flow 400 advances to the next target interval. In some instances, the process flow 400 may also advance to both the next source interval and the next target interval as well.

Condition 414 involves determining if the last source or target interval has been reached. If condition 414 is met, the process flow 400 proceeds to operation 416. If condition 414 is not met, the process flow returns to condition 406. Operation 416 involves outputting the best cost value.

FIG. 5 illustrates an example method 500 for determining a shortest path between nodes, in accordance with one or more example embodiments of the disclosure. Some or all of the blocks of the process flows in this disclosure may be performed in a distributed manner across any number of devices or systems (for example, mobile device 602, computing device 620, computing device 700, and/or any other type of device, system, etc.). The operations of the process flow 500 may be optional and may be performed in a different order.

At block 502 of the process flow 500, computer-executable instructions stored on the memory of a device may be executed to determine, using one or more processors and based on a multi-level overlay data structure, one or more hub labels associated with one or more nodes included within a shortest path graph At block 504 of the process flow 500, computer-executable instructions stored on the memory of a device may be executed to receive, using the one or more processors, an indication of a first node and a second node of the one or more nodes.

At block 506 of the process flow 500, computer-executable instructions stored on the memory of a device may be executed to determine, using the one or more processors, based on the multi-level overlay data structure, and using the one or more hub labels, a shortest path or a cost between the first node and the second node.

Figure 6:
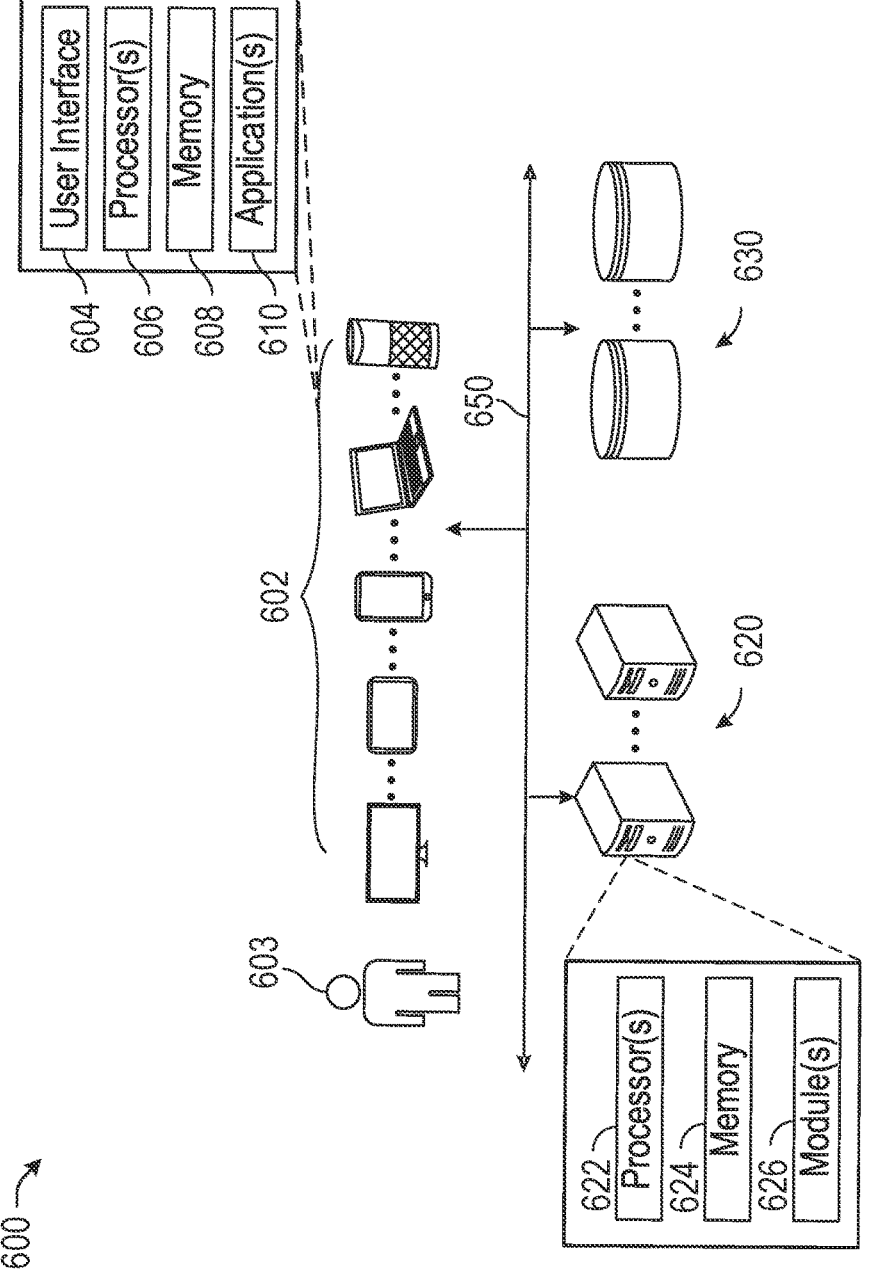
FIG. 6 illustrates an example system for determining a shortest path between nodes, in accordance with one or more example embodiments of the disclosure.

FIG. 6 illustrates an example system 600 for determining a shortest path between nodes, in accordance with one or more example embodiments of the disclosure. In one or more embodiments, the system 600 may include one or more mobile devices 602 (which may be associated with one or more users 603), one or more computing devices 620, and/or one or more databases 630. However, these components of the system 600 are merely exemplary and are not intended to be limiting in any way. For simplicity, reference may be made hereinafter to a mobile device 602, computing device 620, database 630, etc., however, this is not intended to be limiting and may still refer to any number of such elements. Furthermore, any reference to multiple of such elements may similarly refer to a single element as well.

The mobile device 602 may be any type of device, such as a smartphone, desktop computer, laptop computer, tablet, and/or any other type of device. The mobile device 602 may include an application 610 that may allow a user 603 perform certain functions described herein. For example, the application 610 may allow the user 603 to input one or more delivery destinations and/or starting locations and may determine a delivery route using the modified MLO data structure described herein. The application 610 may then display the delivery route to the user 603 and may provide navigation instructions to the user 603. The application 610 may also perform any other processing and provide any other types of information to the user 603. The user 603 may be able to interact with the application 610 through a user interface 604 of the mobile device 602. The mobile device 602 may also include processor(s) 606 and memory 608.

The computing device 620 may be any type of device or system used to perform any of the processing described herein. For example, the computing device 620 may also receive as inputs one or more delivery destinations and/or starting locations and may determine a delivery route using the modified MLO data structure described herein. That is, the mobile device 602 and/or the computing device 620 may host the MLO data structure used to determine a shortest path between nodes as described herein. In some instances, a combination of the mobile device 602 and the computing device 620 may be used to perform the processing. The computing device 620 may also include one or more processors 622 and memory 624.

The database 630 may store any of the data that is used as described herein. For example, the database 630 may store information about any MLO data structures, any searches being performed, determined delivery routes and/or prospective delivery routes, shortcuts within the MLO data structure, and/or any other relevant information.

In one or more embodiments, any of the elements of the system 600 (for example, one or more mobile devices 602, one or more computing devices 620, one or more databases 630, and/or any other element described with respect to FIG. 6 or otherwise) may be configured to communicate via a communications network 650. The communications network 650 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 650 may have any suitable communication range associated therewith and may include, for example, global networks (e.g., the Internet), metropolitan area networks (MANs), wide area networks (WANs), local area networks (LANs), or personal area networks (PANs). In addition, communications network 650 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more mobile devices 602, one or more computing devices 620, and/or one or more databases 630) of the system 600 may include any of the elements of the computing device 700 as well.

Figure 7:
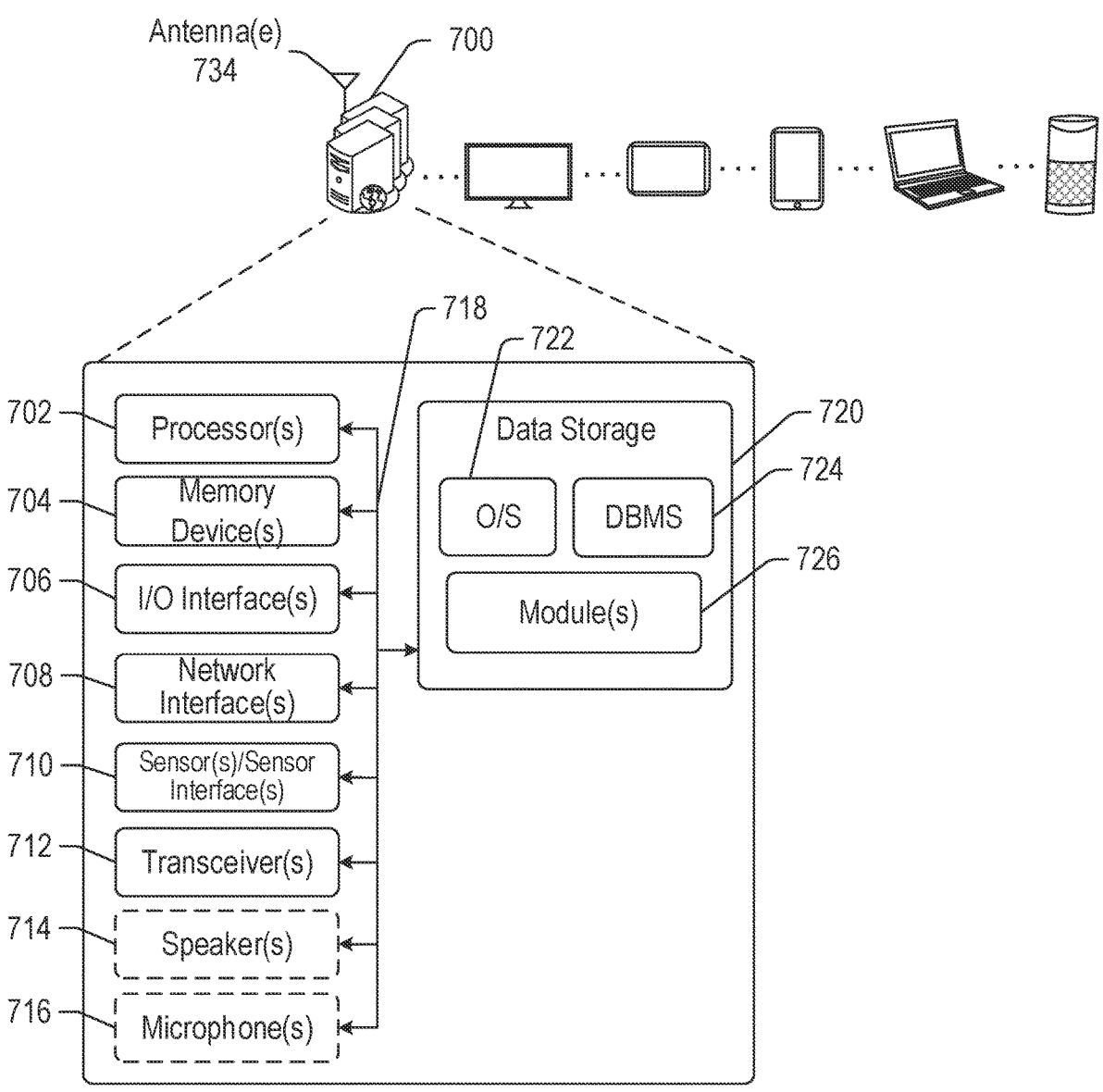
FIG. 7 illustrates an example computing device, in accordance with one or more example embodiments of the disclosure.

FIG. 7 is a schematic block diagram of an illustrative computing device 700 in accordance with one or more example embodiments of the disclosure. The computing device 700 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 700 may correspond to an illustrative device configuration for the devices of FIGS. 1-6.

The computing device 700 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The computing device 700 may further include one or more buses 718 that functionally couple various components of the computing device 700. The computing device 700 may further include one or more antenna (e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system buses, the memory bus, an address bus, or a message bus, and may permit exchange of information (e.g., data (including computer-executable code), signaling, etc.) between various components of the computing device 700. The bus(es) 718 may include, without limitation, the memory bus or the memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the computing device 700 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random-access memory (SRAM), various types of dynamic random-access memory (DRAM), various types of unalterable ROM, and/or writeable variants of ROM such as electrically erasable programmable read-only memory (EE-PROM), flash memory, and so forth. The memory 704 may include main memory as well as various forms of cache memory such as instruction cache(s), data cache(s), translation look-aside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage, including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more module(s) 726, one or more communication module(s) 728, one or more content scanning module(s) 730, and/or one or more prediction module(s) 732. Some or all of these module (s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor (s) 702. Any of the components depicted as being stored in data storage 720 may support the functionality described in reference to correspondingly named components earlier in this disclosure.

The data storage 720 may further store various types of data utilized by components of the computing device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, purchase history information, user action information, user profile information, a database linking search queries and user actions, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the computing device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the module(s) 726 may include computer-executable instructions, code, or the like that responsive to execution by one or more of the processor(s) 702 may perform functions including, but not limited to, performing any functionality associated with the one or more machine learning models 202, the simulation engine 210, and the assignment engine 208, and/or any other functionality described herein associated with picklist assignments or otherwise.

Referring now to other illustrative components depicted as being stored in the data storage 720, the O/S 722 may be loaded from the data storage 720 into the memory 704 and may provide an interface between other application software executing on the computing device 700 and the hardware resources of the computing device 700. More specifically, the O/S 722 may include a set of computer-executable instructions for managing the hardware resources of the computing device 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 700 is a mobile device, the DBMS 724 may be any suitable light-weight DBMS optimized for performance on a mobile device.

Referring now to other illustrative components of the computing device 700, the input/output (I/O) interface(s) 706 may facilitate the receipt of input information by the computing device 700 from one or more I/O devices as well as the output of information from the computing device 700 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna (e) 734 to connect to one or more networks via a wireless local area network (WLAN) (such as Wi-Fi) radio, Bluetooth, ZigBee, and/or a wireless network radio, such as a radio capable of communication with a wireless communication network such as a Long-Term Evolution (LTE) network, WiMAX network, 3G network, ZigBee network, etc.

The computing device 700 may further include one or more network interface(s) 708 via which the computing device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna (e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna (e) 734 may be communicatively coupled to one or more transceivers 712 or radio components to which or from which signals may be transmitted or received.

As previously described, the antenna (e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g. 802.11n), 5 GHz channels (e.g., 802.11n, 802.11ac), or 60 GHz channels (e.g., 802.11ad). In alternative example embodiments, the antenna (c) 734 may be configured to transmit or receive radio frequency signals within any suitable frequency range, forming part of the unlicensed portion of the radio spectrum.

The antenna (c) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna (c) 734—transmitting or receiving radio frequency (RF) signals in the bandwidth and/or channels corresponding to the communications protocols utilized by the computing device 700 to communicate with other devices. The transceiver(s) 712 may include hardware, software, and/or firmware for modulating, transmitting, or receiving—potentially in cooperation with any of antenna (c) 734—communications signals according to any of the communications protocols discussed above including, but not limited to, one or more Wi-Fi and/or Wi-Fi direct protocols, as standardized by the IEEE 802.7 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computing device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computing device 700 may include alternate and/or additional hardware, software, or firmware components beyond those described or depicted without departing from the scope of the disclosure. More particularly, it should be appreciated that software, firmware, or hardware components depicted as forming part of the computing device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components, including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receive, using one or more processors, input data including information about locations within a road network and conditions associated with the road network, the conditions including at least: one or more distances between the locations and one of more times to traverse between the locations;

pre-processing, using the one or more processors and based on a multi-level overlay (MLO) algorithm, the input data to form a stable shortest path graph including the locations within the road network, wherein the locations are categorized into a hierarchy of cells and levels, and wherein a number of boundary arcs between cells is minimized by optimizing partitioning parameters;

determining, using one or more processors and based on the MLO data structure, one or more hub labels associated with the locations included within a shortest path graph;

modifying, using the one or more processors, an order of hub identifiers associated with the one or more hubs labels into a sequential order by assigning consecutive identifiers to boundary arcs from a same cell in the hierarchy to improve memory access patterns during query processing;

storing, in memory, the hub identifiers as intervals representing contiguous ranges of values instead of as individual listings to reduce memory requirements and enable faster query processing;

receiving, using the one or more processors, a delivery route query including an indication of a first location and a second location of the locations, wherein the first location is a starting location of a delivery route, and the second location is a destination location of the delivery route; and determining, using the one or more processors, based on the MLO data structure, and using the one or more hub labels, a shortest path between the first location and the second location by performing label intersection using interval-based operations on the ranges of hub identifier values to reduce computational resource usage, wherein the shortest path is a delivery route between the starting location and the destination location;

sending, using the one or more processors, the delivery route to a delivery vehicle or a device associated with a delivery driver of the delivery vehicle; and autonomously navigating a delivery vehicle along the delivery route.

2. The method of claim 1, further comprising:
performing a forward search of the shortest path graph from the first location;
performing a backward search of the shortest path graph from the second location; and
determining, based on the forward search and the backward search, a first cell within the shortest path graph in which the forward search and backward search intersect.

3. The method of claim 2, wherein determining the shortest path between the first location and the second location further comprises performing a search within the first cell and a first level associated with the first cell instead of a second cell and a second level associated with the second cell.

4. A method comprising:
determining, using one or more processors and based on a multi-level overlay (MLO) data structure, one or more hub labels associated with one or more nodes included within a shortest path graph;

receiving, using the one or more processors, an indication of a first node and a second node of the one or more nodes;

generating canonical labels using asymmetric pruning, wherein the asymmetric pruning reduces a number of the one or more hub labels by including only boundary arcs of cells including a terminal tail vertex of a hub label at each level of the MLO data structure, and wherein forward labels maintain complete hub information while backward labels are asymmetrically pruned to reduce storage requirements and accelerate queries;

determining, using the one or more processors and the one or more hub labels, a shortest path or a cost between the first node and the second node; and autonomously navigating a delivery vehicle along the delivery route.

5. The method of claim 4, wherein the first node is a starting location of a delivery route, wherein the second node is a destination location of the delivery route, and wherein the shortest path is a delivery route between the starting location and the destination location.

6. The method of claim 4, further comprising:

modifying an order of hub identifiers associated with the one or more hubs labels into a sequential order.

7. The method of claim 4, further comprising:

storing, in memory, one or more ranges of hub identifier values instead of all hub identifiers.

8. The method of claim 4, further comprising:

performing a forward search of the shortest path graph from the first node;

performing a backward search of the shortest path graph from the second node; and determining, based on the forward search and the backward search, a first cell within the shortest path graph in which the forward search and backward search intersect, wherein determining the shortest path between the first node and the second node further comprises performing a search within the first cell and a first level associated with the first cell instead of a second cell and a second level associated with the second cell.

9. The method of claim 8, further comprising:

determining that a current interval minimum is higher than a best cost value, wherein an interval comprises a continuous range of hub identifier values that are stored together with an associated interval minimum to reduce memory usage and enable interval skipping during query processing; and advancing to a subsequent source interval and/or a subsequent target interval based on the determination without examining individual hub identifiers within the current interval.

10. A system comprising:

memory that stores computer-executable instructions; and one or more processors configured to access the memory and execute the computer-executable instructions to:

determine, based on a multi-level overlay algorithm, one or more hub labels associated with one or more nodes included within a shortest path graph;

receive an indication of a first node and a second node of the one or more nodes;

perform a forward search of the shortest path graph from the first node;

perform a backward search of the shortest path graph from the second node;

determine, based on the forward search and the backward search, a first cell within the shortest path graph in which the forward search and backward search intersect;

perform a search within the first cell and a first level associated with the first cell instead of a second cell and a second level associated with the second cell;

determine that a current interval minimum is higher than a best cost value, wherein an interval comprises a continuous range of hub identifier values that are stored together with an associated interval minimum to reduce memory usage and enable interval skipping during query processing;

advance to a subsequent source interval and/or a subsequent target interval based on the determination without examining individual hub identifiers within the current interval;

determine, based on the multi-level overlay data structure, and using the one or more hub labels, a shortest path or a cost between the first node and the second node; and autonomously navigate a delivery vehicle along the delivery route.

11. The system of claim 10, wherein the first node is a starting location of a delivery route, wherein the second node is a destination location of the delivery route, and wherein the shortest path is a delivery route between the starting location and the destination location.

12. The system of claim 10, wherein the one or more processors are further configured to execute the computer-executable instructions to:

modify an order of hub identifiers associated with the one or more hubs labels into a sequential order.

13. The system of claim 10, wherein the one or more processors are further configured to execute the computer-executable instructions to:

store, in memory, a range of hub identifier values instead of all hub identifiers.

14. The system of claim 10, wherein the one or more processors are further configured to execute the computer-executable instructions to:

generate canonical labels using asymmetric pruning.

* * * * *